(12) United States Patent
Kumabe et al.

(10) Patent No.: US 10,664,393 B2
(45) Date of Patent: May 26, 2020

(54) STORAGE CONTROL APPARATUS FOR MANAGING PAGES OF CACHE AND COMPUTER-READABLE STORAGE MEDIUM STORING PROGRAM

(71) Applicant: FUJITSU LIMITED, Kawasaki-shi, Kanagawa (JP)

(72) Inventors: Takuro Kumabe, Kawasaki (JP); Motohiro Sakai, Nerima (JP); Keima Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 16/136,312

(22) Filed: Sep. 20, 2018

(65) Prior Publication Data

US 2019/0155730 A1 May 23, 2019

(30) Foreign Application Priority Data

Nov. 20, 2017 (JP) ................................ 2017-222513

(51) Int. Cl.
| | | |
|---|---|---|
| *G06F 12/00* | (2006.01) | |
| *G06F 12/0804* | (2016.01) | |
| *G06F 12/0873* | (2016.01) | |
| *G06F 12/123* | (2016.01) | |
| *G06F 12/0868* | (2016.01) | |

(52) U.S. Cl.
CPC ...... *G06F 12/0804* (2013.01); *G06F 12/0868* (2013.01); *G06F 12/0873* (2013.01); *G06F 12/123* (2013.01); *G06F 2212/1008* (2013.01); *G06F 2212/261* (2013.01); *G06F 2212/283* (2013.01); *G06F 2212/312* (2013.01); *G06F 2212/608* (2013.01)

(58) Field of Classification Search
CPC ............. G06F 12/0804; G06F 12/0868; G06F 12/123; G06F 12/0873; G06F 2212/312; G06F 2212/261; G06F 2212/283; G06F 2212/1008; G06F 2212/608
USPC ........................................................ 711/126
See application file for complete search history.

(56) References Cited

U.S. PATENT DOCUMENTS

| | | | | |
|---|---|---|---|---|
| 4,490,782 | A | * | 12/1984 | Dixon ................. G06F 12/0862 |
| | | | | 711/136 |
| 2004/0054992 | A1 | | 3/2004 | Nair et al. |
| 2004/0078532 | A1 | | 4/2004 | Tremaine |
| 2007/0220514 | A1 | | 9/2007 | Sugimoto et al. |
| 2014/0089540 | A1 | | 3/2014 | Tsukada et al. |
| 2015/0278114 | A1 | | 10/2015 | Kumabe et al. |
| 2016/0357454 | A1 | * | 12/2016 | Lee ....................... G06F 3/0611 |
| 2017/0075620 | A1 | * | 3/2017 | Yamamoto ............ G06F 3/0608 |

FOREIGN PATENT DOCUMENTS

| | | |
|---|---|---|
| JP | 2004-110824 | 4/2004 |
| JP | 2004-164607 | 6/2004 |
| JP | 2007-249729 | 9/2007 |
| JP | 2015-520899 | 7/2015 |
| JP | 2015-191604 | 11/2015 |
| WO | 2014/049635 | 4/2014 |

* cited by examiner

Primary Examiner — Mardochee Chery
(74) *Attorney, Agent, or Firm* — Fujitsu Patent Center

(57) ABSTRACT

A memory includes a plurality of pages used as a cache area. A processor allocates a first storage resource to a first link indicating a first page group of the plurality of pages, and a second storage resource to a second link indicating a second page group of the plurality of pages. The processor uses the first and the second links, and processes access requests for accessing to the first and the second storage resources, in parallel.

19 Claims, 13 Drawing Sheets

STORAGE CONTROL APPARATUS FOR MANAGING PAGES OF CACHE AND COMPUTER-READABLE STORAGE MEDIUM STORING PROGRAM

CROSS-REFERENCE TO RELATED APPLICATION

This application is based upon and claims the benefit of priority of the prior Japanese Patent Application No. 2017-222513, filed on Nov. 20, 2017, the entire contents of which are incorporated herein by reference.

FIELD

The present invention relates to a storage control apparatus and a computer-readable storage medium storing a program.

BACKGROUND

A storage apparatus is used to save data. The storage apparatus may have a plurality of storage devices, such as hard disk drives (HDDs) or solid state drives (SSDs), and provides a large storage area. The storage apparatus is connected to a storage control apparatus which performs access control to write/read data to/from the storage devices. The storage apparatus may include the storage control apparatus.

The storage control apparatus may be provided with a plurality of processors which perform a plurality of input/output (I/O) processings. In this configuration, the plurality of processors perform the I/O processings in parallel to increase the speed of data access. In one proposal for example, when a plurality of microprocessors perform I/O processing, and when a load of one microprocessor is equal to or larger than a first load, a storage system assigns part of the I/O processing to another microprocessor. In another proposal, a storage apparatus assigns I/O processing to a plurality of main processors in accordance with usage rates of the main processors.

In another proposal, a single data-processing system divides a shared resource of a memory into units called partitions, and allocates the partitions to a plurality of processes or agents of the system. The system reallocates the shared resource by adding one portion of the shared resource to a partition which is being frequently used, and removing one portion of the shared resource from a partition which is being less frequently used. In the other proposal, in a shared multiprocessing system in which all processors communicate with each other via a shared main memory, while a first processor performs an application binary, another processor monitors the performance of the first processor to optimize the execution of the application binary.

By the way, a certain storage device uses a cache memory whose access speed is faster than the storage devices. For example, for increasing the speed of data access, a storage control apparatus stores data, which is likely to be accessed, in the cache memory; then reads the data not from a storage device but from the cache memory when the data is requested by another apparatus; and then sends the data to the other apparatus.

See, for example, Japanese Laid-open Patent Publication No. 2007-249729, International Publication Pamphlet No. WO2014/049635, Japanese Laid-open Patent Publication No. 2004-164607, and Japanese Laid-open Patent Publication No. 2004-110824.

The cache memory has a limited capacity of storage. Thus, the storage control apparatus may manage a plurality of unit areas, which are being used, of the cache memory by using data (referred to also as a link or linked lists) having list structures. In addition, the storage control apparatus may use an algorithm, such as the LRU (least recently used), to reuse the unit areas. In this case, the operation to the link is exclusively performed by a process which has acquired an exclusion resource. Thus, the link is not simultaneously operated by a plurality of processes, so that the consistency of operation result to data is kept. However, when the unit areas of the cache memory are managed by using the single link, other processes will wait to acquire the exclusion resource. This lowers the degree of parallel processing to access a storage apparatus.

SUMMARY

In one aspect of the embodiments, there is provided a storage control apparatus including: a memory including a plurality of pages used as a cache area; and a processor configured to execute a process including: allocating a first storage resource to a first link and a second storage resource to a second link, the first link indicating a first page group of the plurality of pages, the second link indicating a second page group of the plurality of pages; and processing, in parallel, access requests for accessing to the first storage resource and the second storage resource by using the first link and the second link.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, some embodiments will be described with reference to the accompanying drawings.

First Embodiment

Figure 1:
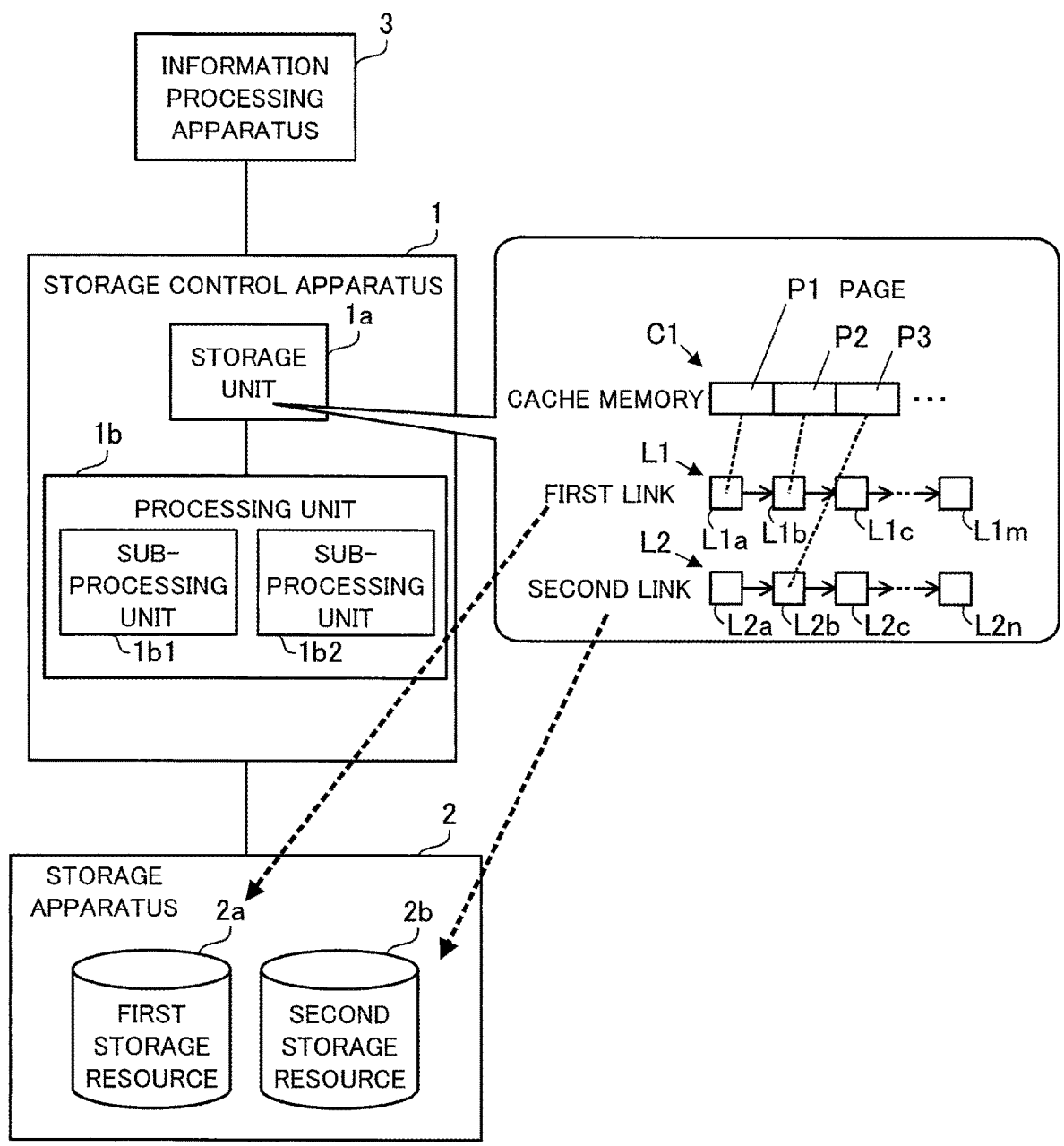
FIG. 1 illustrates a storage control apparatus of a first embodiment.

FIG. 1 illustrates a storage control apparatus of a first embodiment. A storage control apparatus 1 is connected to a storage apparatus 2 and an information processing apparatus 3. The storage apparatus 2 includes a plurality of storage devices, such as HDDs or SSDs. The storage apparatus 2 may include the storage control apparatus 1.

The information processing apparatus 3 sends an access request to the storage control apparatus 1 for accessing data stored in the storage apparatus 2. The storage control apparatus 1 receives the access request from the information processing apparatus 3; and accesses the data stored in the storage apparatus 2, in accordance with the access request. The storage control apparatus 1 has a cache memory. The storage control apparatus 1 uses the cache memory to increase the speed of response to the access request from the information processing apparatus 3. The storage control apparatus 1 has a storage unit 1a and a processing unit 1b.

The storage unit 1a is achieved by a volatile storage device, such as a random access memory (RAM). The storage unit 1a includes a storage area used as a cache memory C1. For management, the storage area, which is used as the cache memory C1, is divided into storage areas (unit areas), each referred to as a page or a cache page and having a predetermined size. For example, the cache memory C1 includes pages P1, P2, P3, . . . . That is, the storage unit 1a has a plurality of pages used as the cache memory C1. The pages P1, P2, P3, . . . store the data read from the storage apparatus 2, and the data which was sent from the information processing apparatus 3 and will be written to the storage apparatus (the data will be written to the storage apparatus 2 by using write back). The data of the cache memory C1 may be written to the storage apparatus 2 periodically or when an idle time occurs in processing.

The processing unit 1b is a multiprocessor including a plurality of processors, which execute programs. The processing unit 1b may be a multi-core central processing unit (CPU) or multi-core processor including a plurality of cores, which execute programs. The processing unit 1b has sub-processing units 1b1 and 1b2. The sub-processing unit 1b1 may be a single processor, or a single core. Similarly, the sub-processing unit 1b2 may be a single processor, or a single core. The sub-processing units 1b1 and 1b2 share the storage unit 1a. A technique in which a plurality of processors or cores share a memory resource to perform processing is called symmetric multiprocessing (SMP). In the following description, the processing performed by the processing unit 1b may be performed by the sub-processing unit 1b1 or 1b2. The processing unit 1b may include three or more sub-processing units.

The processing unit 1b allocates a first storage resource 2a to a first link L1 which indicates a first page group of the plurality of pages. Similarly, the processing unit 1b allocates a second storage resource 2b to a second link L2 which indicates a second page group of the plurality of pages.

Each of the storage resources is a group of storage areas of the storage devices of the storage apparatus 2. Each of the storage resources may be a group of logical storage areas, such as logical units (LUs), of the storage devices of the storage apparatus 2. Each storage resource has its corresponding storage areas. The first and the second storage resources 2a and 2b are included in the storage apparatus 2.

The first and the second links L1 and L2 are used to manage pages of the cache memory C1, which are being used (the pages are storing data), and to reuse the pages. The processing unit 1b uses an algorithm, such as the LRU algorithm, to operate the first and the second links L1 and L2; and unallocates pages P1, P2, P3, . . . which are being used (or releases data stored in the pages P1, P2, P3, . . . ).

The first and the second links L1 and L2 each have a data structure (list structure) in which one link element, called a structure, is sequentially linked to another link element by a corresponding pointer. The first and the second links L1 and L2 may be called linked lists. In particular, when used for the LRU algorithm, the first and the second links L1 and L2 may be called LRU links or LRU lists. One link element is associated in advance with one page. The pages managed by the first link L1 and the pages managed by the second link L2 do not overlap with each other.

The first link L1 includes link elements L1a, L1b, L1c, . . . L1m corresponding to pages P1, P2, (first page group). For example, the link element L1a corresponds to the page P1. Similarly, the link element L1b corresponds to the page P2. At a certain point of time, the link elements L1a, L1b, L1c, . . . L1m are linked with each other in this order by pointers. The second link L2 includes link elements L2a, L2b, L2c, . . . L2n corresponding to pages P3, . . . (second page group). For example, the link element L2b corresponds to the page P3. At a certain point of time, the link elements L2a, L2b, L2c, . . . L2n are linked with each other in this order by pointers.

For example, a link element of the first link L1 located at the left end in FIG. 1 corresponds to an LRU-side page (which is of the pages associated with the first link L1, and has the longest elapsed time since its last access). On the other hand, a link element of the first link L1 located at the right end in FIG. 1 corresponds to an MRU-side page (which is of the pages associated with the first link L1, and has been accessed most recently). Here, the MRU stands for "most recently use". Similarly, the second link L2 has a link element (located at the left end) corresponding to an LRU-side page, and a link element (located at the right end) corresponding to an MRU-side page.

The operation to the first link L1 is performed exclusively. Thus, the storage unit 1a stores a first exclusion resource for the first link L1. The first exclusion resource is a flag indicating that the first exclusion resource is being acquired by any of the sub-processing units, or that the first exclusion resource is not being acquired by the sub-processing units. When one sub-processing unit acquires the first exclusion resource (that is, sets the first exclusion resource as "acquired"), the sub-processing unit is able to operate the first link L1. Upon completion of a process involving the first link L1, the sub-processing unit resets the first exclusion resource as "not acquired". Similarly, the operation to the second link L2 is performed exclusively. Thus, the storage unit 1a stores a second exclusion resource for the second link L2. The second exclusion resource is a flag indicating that the second exclusion resource is being acquired by any of the sub-processing units, or that the second exclusion resource is not being acquired by the sub-processing units. When one sub-processing unit acquires the second exclusion resource, the sub-processing unit is able to operate the second link L2.

Thus, allocating the first storage resource 2a to the first link L1 is to allocate the first storage resource 2a to the first exclusion resource. Similarly, allocating the second storage resource 2b to the second link L2 is to allocate the second storage resource 2b to the second exclusion resource.

The processing unit 1b uses the first and the second links L1 and L2, and processes access requests for accessing to the first and the second storage resources 2a and 2b, in parallel.

For example, when the sub-processing unit 1b1 receives an access request to write/read data to/from the first storage resource 2a, from the information processing apparatus 3, the sub-processing unit 1b1 acquires the first exclusion resource, then operates the first link L1, and then stores data which has been sent by the information processing apparatus 3 or read from the first storage resource 2a, in the cache memory C1.

The operation to the first and the second links L1 and L2 is performed by using the LRU algorithm. For example, when the sub-processing unit 1b1 stores new data to be written to the first storage resource 2a in the cache memory C1, if the cache memory C1 has a free page, the sub-processing unit 1b1 adds a link element corresponding to the free page, to an MRU-side link element of the first link L1. Then the sub-processing unit 1b1 stores the new data in the free page. The addition of the link element to the first link L1 allows the page associated with the added link element to be used to access the first storage resource 2a. As a result, the cache capacity to access the first storage resource 2a increases by the capacity of the added page.

In contrast, if the cache memory C1 has no free page, the sub-processing unit 1b1 overwrites a page associated with an LRU-side link element of the first link L1, with the new data (old data of the page is erased by the overwrite). In this case, a page storing data yet to be written to the first storage resource 2a is not reused (the page will be reusable after the data is written to the first storage resource 2a). Then the sub-processing unit 1b1 moves the link element associated with the page to which the new data has been written, to an MRU-side link element of the first link L1.

In this manner, if there is no free page, the sub-processing unit 1b1 unallocates and reuses a page which has not been accessed recently, prior to the others. When the sub-processing unit 1b1 stores new data, which is to be written to the second storage resource 2b, in the cache memory C1, the sub-processing unit 1b1 performs the same operation to the second link L2. In addition, the sub-processing unit 1b2 also operates the first and the second links L1 and L2, like the sub-processing unit 1b1.

The processing unit 1b may cause the sub-processing units 1b1 and 1b2 to process access requests for accessing to the first and the second storage resources 2a and 2b, in parallel. Specifically, while the sub-processing unit 1b1 acquires the first exclusion resource, and processes an access request for accessing to the first storage resource 2a by using the first link L1, the sub-processing unit 1b2 may acquire the second exclusion resource, and operate the second link L2.

That is, the processing unit 1b performs the I/O processing to the first storage resource 2a and the I/O processing to the second storage resource 2b, in parallel. The former I/O processing is performed by the sub-processing unit 1b1 by using the first link L1, and the latter I/O processing is performed by the sub-processing unit 1b2 by using the second link L2. Alternatively, the former I/O processing may be performed by the sub-processing unit 1b2 by using the first link L1, and the latter I/O processing may be performed by the sub-processing unit 1b1 by using the second link L2.

Here, the storage control apparatus 1 could manage pages of the cache memory C1, which are being used, by using a single link and a single exclusion resource corresponding to the single link. However, in a case where the cache memory C1 is shared by a plurality of sub-processing units as in SMP, while one sub-processing unit acquires the exclusion resource and processes an access request, the other sub-processing units have to wait to acquire the exclusion resource. This lowers the degree of parallel processing to access a storage apparatus. To prevent the degree of parallel processing from lowering, it is preferable that the waiting time to acquire the exclusion resource is reduced.

Thus, in the storage control apparatus 1, a storage area of the storage apparatus 2 is divided into a plurality of storage resources, and the storage resources are each provided with a corresponding link and an exclusion resource corresponding to the link. The number of the links (or storage resources) is two in the above-described example, but may be determined depending on the number of sub-processing units. If the number of the sub-processing units is M (M is an integer equal to or larger than 2), the number N of the links (or the exclusion resources) satisfies $2 \leq N \leq M$ (N is an integer equal to or larger than 2). Each of the sub-processing units allocates a corresponding storage resource to one of N number of exclusion resources, acquires the allocated exclusion resource, and performs I/O processing on the corresponding storage resource. In this manner, the storage control apparatus 1 reduces the waiting time for the sub-processing units to acquire an exclusion resource, and improves the degree of parallel processing to access the storage apparatus.

To acquire a link element corresponding to a free page and add the link element to the first link L1 or the second link L2, the following method may be used. The storage unit 1a stores a free link (or free list) in which link elements corresponding to free pages are linked with each other by pointers. The free link is also data having list structures. The processing unit 1b acquires a link element from the free list in the order of arrival of access requests for accessing to the storage resources, and adds the link element to an MRU-side link element of the first link L1 or the second link L2 in accordance with a storage resource to be accessed. In this case, the storage unit 1a stores a third exclusion resource corresponding to the free link.

Preferably, a single free link is provided for the cache memory C1, and a link element is acquired from the free link and added to the first link L1 or the second link L2. If a plurality of free links were provided such that one free link is provided for the first link L1 and another free link is provided for the second link L2, a cache capacity available to access one storage resource would be limited. For example, if N number of free links were provided, the upper limit of a cache capacity available to access one storage resource would become 1/N of the whole capacity of the cache memory C1. For this reason, the single free link is provided. With the single free link, the processing unit 1b secures cache capacities for the storage resources in accordance with access condition (for example, a larger cache capacity is secured for a more accessed storage resource, and a smaller cache capacity is secured for a less accessed storage resource). Securing a larger cache capacity for a more accessed storage resource improves data access performance to the storage apparatus 2.

Here, a load of one storage resource corresponding to an initial access condition is not necessarily constant. For example, although the number of accesses to one storage resource is initially large, it may decrease with time. In contrast, although the number of accesses to another storage resource is initially small, it may increase with time.

Thus, the processing unit 1b may perform the following processing. That is, when there is no free page, and when the cache capacity for the first storage resource 2a runs short and becomes equals to or lower than a threshold (the number of link elements of the first link L1 becomes equal to or lower than a threshold), the processing unit 1b reallocates a page which is being used for the second storage resource 2b, to the first storage resource 2a.

That is, the processing unit 1b may acquire a link element of the second link L2 (for example, the link element is an LRU-side link element corresponding to a page having no data yet to be written to the second storage resource 2b), and move the link element to the first link L1. Moving a link element is to reallocate a page corresponding to the link element from one storage resource to another storage resource. For example, with the above-described movement, the cache capacity available to access the second storage resource 2b decreases, and the cache capacity available to access the first storage resource 2a increases.

In contrast, when the cache capacity for the first storage resource 2a is larger than a threshold (the number of link elements of the first link L1 is larger than a threshold), the processing unit 1b identifies a page to be unallocated, by using the first link L1; and reuses the page. In the reuse of page, when reusable pages of the first page group indicated by the first link L1 are insufficient, the processing unit 1b may move link elements of the second link L2 to the first link L1.

For example, the processing unit 1b may determine whether to move link elements, periodically or upon reception of an access request (that is, the processing unit 1b may determine whether the above-described cache capacity is insufficient, and is equal to or lower than a cache capacity threshold), and move the link elements depending on the determination result.

By the way, in the movement of link elements, the processing unit 1b performs the following procedure. That is, the processing unit 1b acquires an exclusion resource corresponding to a link from which link elements are moved; then unallocates pages corresponding to the link elements and associated with the link; then releases the exclusion resource corresponding to the link; then acquires an exclusion resource corresponding to a link to which link elements are moved; and then adds the link elements, corresponding to the pages, to the link. However, the movement of the link elements, which involves these procedures, causes overhead in processing an access request. For example, in a case where link elements are moved every time the cache capacity runs short, when a storage resource corresponding to a link to which link elements are moved is frequently accessed, the access to the storage resource may take time. For this reason, the processing unit 1b may change the number of link elements to be moved at a time, in accordance with loads of the storage resources.

For example, the processing unit 1b may increase the number of link elements to be moved at a time to a link, which is associated with a certain storage resource, as the number of times in which link elements have been successively moved to the link increases. This is because the storage resource may be successively accessed and have its increasing access load.

Alternatively, the processing unit 1b may increase the number of link elements to be moved at a time, in accordance with a comparison result between a first number of accesses and a second number of accesses. The first number of accesses is a number by which a storage resource corresponding to a link, from which link elements are moved, has been accessed. The second number of accesses is a number by which a storage resource corresponding to a link, to which link elements are moved, has been accessed. For example, when the second number of accesses is larger than the first number of accesses, the processing unit 1b may increase the number of link elements to be moved at a time, in accordance with a difference between the first number of accesses and the second number of accesses. More specifically, the processing unit 1b may increase the number of link elements to be moved at a time, as the difference between the first number of accesses and the second number of accesses increases.

In this manner, the storage control apparatus 1 increases the speed of access to the storage apparatus 2, by reducing the number of movements of link elements, involved in reallocating pages.

In the following description, a more specific storage apparatus will be described as an example, and functions of the storage control apparatus 1 will be further described in detail.

Second Embodiment

Figure 2:
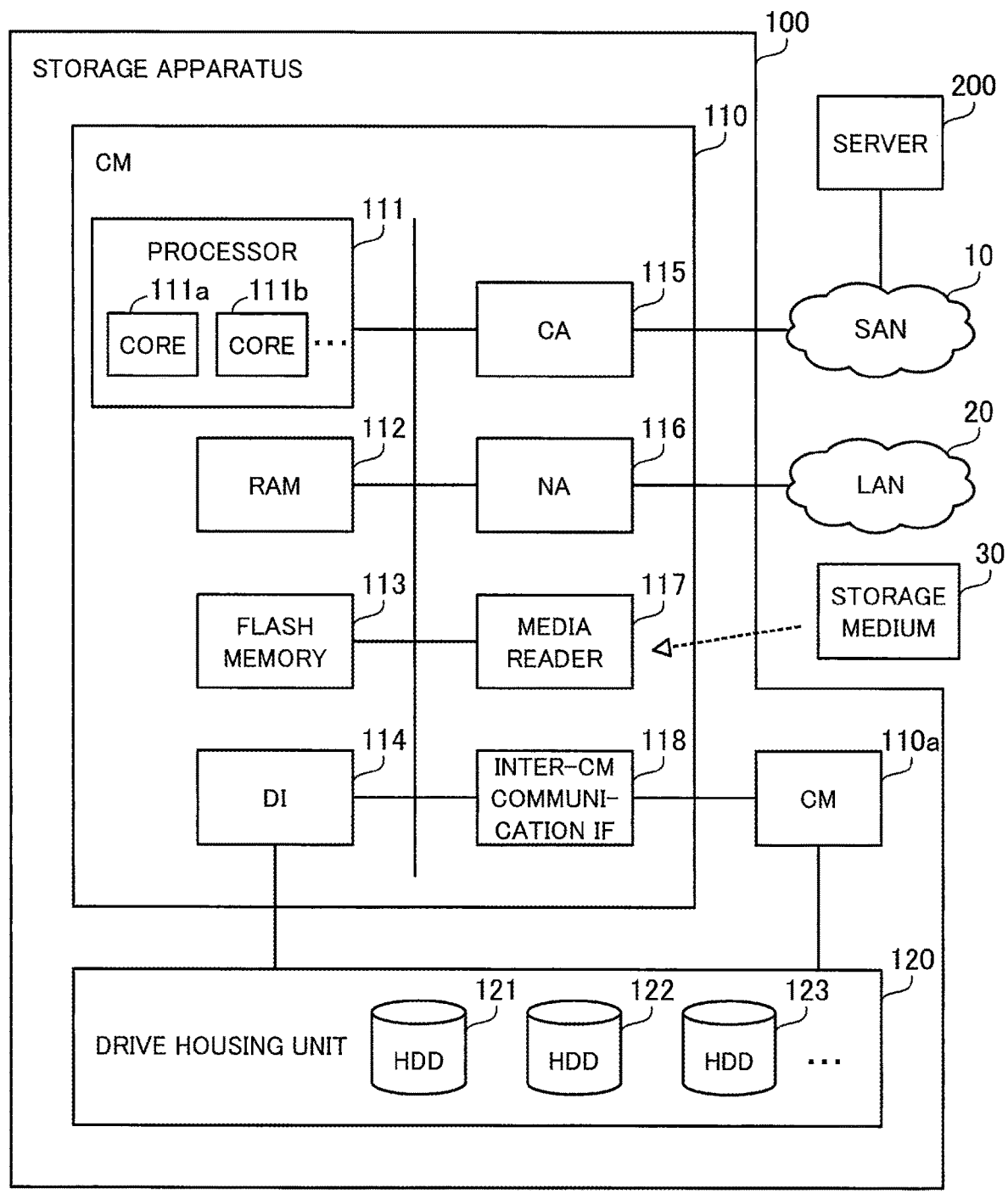
FIG. 2 illustrates an example of hardware of a storage apparatus of a second embodiment.

FIG. 2 illustrates an example of hardware of a storage apparatus of a second embodiment. A storage apparatus 100 has controller modules (CMs) 110 and 110a, and a drive housing unit 120.

The CMs 110 and 110a are storage control apparatuses which control access to a plurality of HDDs housed in the drive housing unit 120. For example, the drive housing unit 120 houses an HDD 121, an HDD 122, an HDD 123, . . . . Additionally or alternatively, the drive housing unit 120 may house other types of storage device, such as SSDs. The CM 110 forms a logical storage area by combining the plurality of HDDs housed in the drive housing unit 120, and using the technique of redundant arrays of inexpensive disks (RAID), and stores data used for processing by a server 200, in the storage area. The CMs 110 and 110a are one example of the storage control apparatus 1 of the first embodiment.

Here, one unit of the resource of the storage apparatus 100 may be a RAID group logical unit (RLU). The RLU is a logical storage area corresponding to a RAID group. For example, the CMs 110 and 110a may divide an RLU into logical storage areas (referred to as logical units, LUs), and provide the LUs for the server 200. The LUs are each identified by using an identification number, which is called a logical unit number (LUN). Each LU is also one unit of the resource of the storage apparatus 100.

The CM 110 has a processor 111, a RAM 112, a flash memory 113, a drive interface (DI) 114, a channel adapter (CA) 115, a network adapter (NA) 116, a media reader 117, and an inter-CM communication interface (IF) 118. These pieces of hardware are connected to a bus of the CM 110. The CM 110a has the same hardware as that of the CM 110.

The processor 111 controls the information processing of the CM 110. The processor 111 is a multi-core processor including a plurality of cores. The plurality of cores include a core 111a, a core 111b, . . . .

The RAM 112 is a main memory of the CM 110. The RAM 112 is a volatile semiconductor memory. The RAM 112 may be a static RAM (SRAM) or a dynamic RAM (DRAM). The RAM 112 temporarily stores at least one part of a program of an OS or firmware, which is to be executed by the processor 111. In addition, the RAM 112 stores various types of data used for processing performed by the processor 111.

The cores 111a, 111b, . . . share the RAM 112 to execute processing. The method in which a plurality of cores share a physical memory (such as the RAM 112) to execute processing is called the SMP.

The flash memory 113 is an auxiliary memory of the CM 110. The flash memory 113 is a non-volatile semiconductor memory; and stores programs including an OS and firmware, and various types of data.

The DI 114 is an interface to communicate with the drive housing unit 120. The DI 114 may be SAS (serial attached SCSI, or serial attached small computer system interface).

The CA 115 is a communication interface connected to a storage area network (SAN) 10. The CA 115 communicates, via the SAN 10, with the server 200 connected to the SAN 10. The CA 115 may be the fibre channel (FC) interface.

The NA 116 is a communication interface to communicate, via a local area network (LAN) 20, with other computers. The NA 116 may be the Ethernet (registered trade mark) interface.

The media reader 117 reads a program and data stored in a storage medium 30. The storage medium 30 may be a non-volatile semiconductor memory, such as a flash memory card. The media reader 117 reads a program and data from the storage medium 30, and stores the program and data in the RAM 112 or the flash memory 113, depending on an instruction from the processor 111.

The inter-CM communication IF 118 is an interface to connect the CM 110 and the CM 110a. The CM 110 may perform data access together with the CM 110a, by using the inter-CM communication IF 118. In one case, the CM 110 may be an operating module, and the CM 110a may be a standby module. In another case, both the CM 110 and the CM 110a may be operating modules, and may perform data access in parallel. In both cases, when one CM fails, the other CM takes over the data access having performed by the failed CM. This prevents a user's work from being stopped. Here, although the CM 110 will be mainly described in the following description, the CM 110a also has the same functions as those of the CM 110.

In addition, although the storage control apparatus 1 is externally connected to the storage apparatus 2 in the first embodiment, the CM 110 (which is one example of the storage control apparatus 1) may be included in the storage apparatus 100, as illustrated in FIG. 2.

Figure 3:
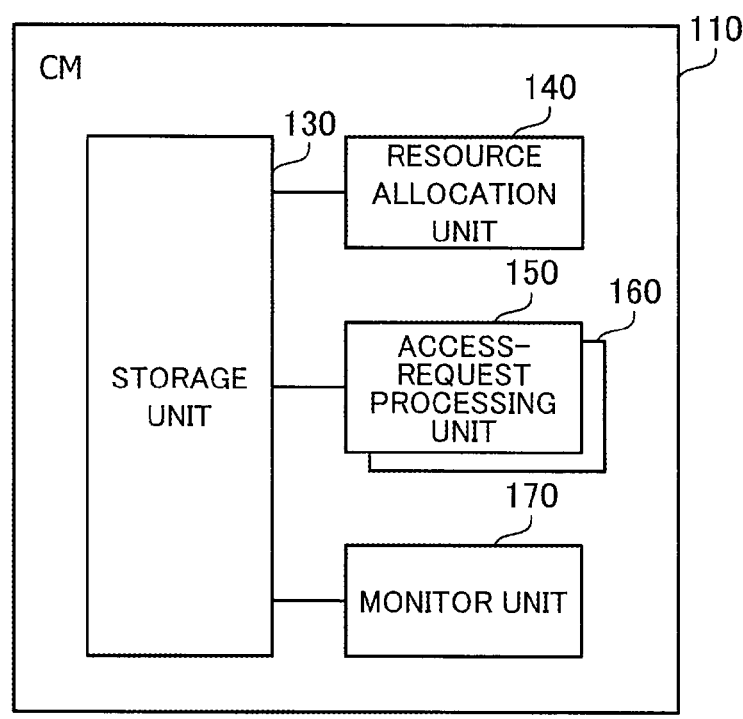
FIG. 3 illustrates an example of functions of a controller module (CM)

FIG. 3 illustrates an example of functions of the CM. The CM 110 has a storage unit 130, a resource allocation unit 140, access-request processing units 150 and 160, and a monitor unit 170. The storage unit 130 is a storage area of the RAM 112. Functions of the resource allocation unit 140, the access-request processing units 150 and 160, and the monitor unit 170 are achieved by the processor 111. For example, the processor 111 executes a program stored in the RAM 112, and thereby achieves the functions of the resource allocation unit 140, the access-request processing units 150 and 160, and the monitor unit 170. The processor 111 causes the core 111a, the core 111b, . . . to execute functions of the access-request processing units 150 and 160, in parallel.

The storage unit 130 serves as a cache memory, which is included in the storage apparatus 100 and used for data access. In the following description, the cache memory will be abbreviated as "cache". One unit of the memory area of the cache is called a page. For example, the size of one page is 65 kilobytes (KB). The storage unit 130 stores a page management table, called a cache bundle element (CBE), for each page. The CBE is one example of the link element of the first embodiment. The CBEs associated with free pages are linked with each other by pointers of the CBEs. The data (linked lists) having list structures and formed by the CBEs associated with free pages, is called a free link. The free link may be called a free list.

In addition, CBEs corresponding to pages which are being used form a link other than the free link. The link of CBEs to manage pages, which are being used, is used to acquire a page by using the LRU algorithm. Thus, the link of CBEs to manage pages, which are being used, is called an LRU link. The LRU link is also data (linked lists) having list structures. The LRU link may be called an LRU list. The storage unit 130 stores one LRU link for one group of the storage resource of the storage apparatus 100. In the example of the second embodiment, the storage resource of the storage apparatus 100 is divided into two groups. Thus, the storage unit 130 stores two LRU links.

The resource allocation unit 140 allocates LUs to a corresponding LRU link (or a corresponding exclusion resource used to operate the LRU link). For example, the resource allocation unit 140 allocates a group of predetermined units, such as RLUs or LUs, of the storage resource to one LRU link. For example, the resource allocation unit 140 allocates the same number of resources to each of the plurality of LRU links. Alternatively, the resource allocation unit 140 may allocate the same capacity of resource to each of the plurality of LRU links. A resource group allocated to one LRU link is one example of a storage resource of the first embodiment.

The access-request processing unit 150 receives, from the server 200, an access request (or I/O request) for accessing to data stored in the storage apparatus 100; and processes the access request by using the cache of the storage unit 130.

Specifically, when receiving an access request to read data, the access-request processing unit 150 reads the data from an accessed LU, then stores the data in the cache, and then sends the data to the server 200. After that, when receiving an access request to read the same data, the access-request processing unit 150 reads the data from the cache, and sends the data to the server 200.

In addition, when receiving an access request to write data and the data from the server 200, the access-request processing unit 150 stores the data in the cache, and sends a write completion message to the server 200. The access-request processing unit 150 writes the data stored in the cache (or data stored in a page) to an LU by using the LRU algorithm, periodically or when an idle time occurs in processing. Such a writing control method is called write back. In the following description, the writing of data stored in the cache to an LU may also be called the write back. The data to be written back is data which has been updated in the cache, or new data sent by the server 200. In addition, the data stored in a page which has not been accessed recently is written back, prior to the others, by using the LRU algorithm.

The access-request processing unit 150 acquires a page (or a CBE) to store new data.

The access-request processing unit 150 operates an LRU link in accordance with its I/O processing. For example, when free pages run out and the cache capacity becomes insufficient, the access-request processing unit 150 unallocates a page associated with the LRU link, by using the LRU algorithm. That is, the access-request processing unit 150 unallocates a page which has not been accessed recently, prior to the others. The access-request processing unit 150 then reuses the unallocated page. Here, the access-request processing unit 150 does not reuse a page which stores data yet to be written back. When the access-request processing unit 150 is unable to acquire a free page through the free link for one LRU link, the access-request processing unit 150 may move a CBE from another LRU link to the one LRU link, under a predetermined condition.

The access-request processing unit 160 performs the same processing as that of the access-request processing unit 150. The access-request processing units 150 and 160 process access requests in parallel. Like the access-request processing unit 150, the access-request processing unit 160 operates an LRU link in accordance with its I/O processing. The access-request processing units 150 and 160 acquire different exclusion resources, and thus operate LRU links corresponding to the acquired exclusion resources, in parallel.

The monitor unit 170 monitors the number (I/O number) of accesses to each storage resource; and adjusts the number of CBEs allocated to each storage resource, asynchronously to I/O processing performed by the access-request processing units 150 and 160 (for example, periodically), in accordance with a monitor result. For example, when the monitor unit 170 detects that the number of accesses to a storage resource having less CBEs (that is, less pages acquired) is larger than the number of accesses to a storage resource having more CBEs (that is, more pages acquired), the monitor unit 170 moves CBEs from an LRU link corresponding to the storage resource having more CBEs to an LRU link corresponding to the storage resource having less CBEs.

Next, an example of exclusion resources provided for the two LRU links will be described.

Figure 4:
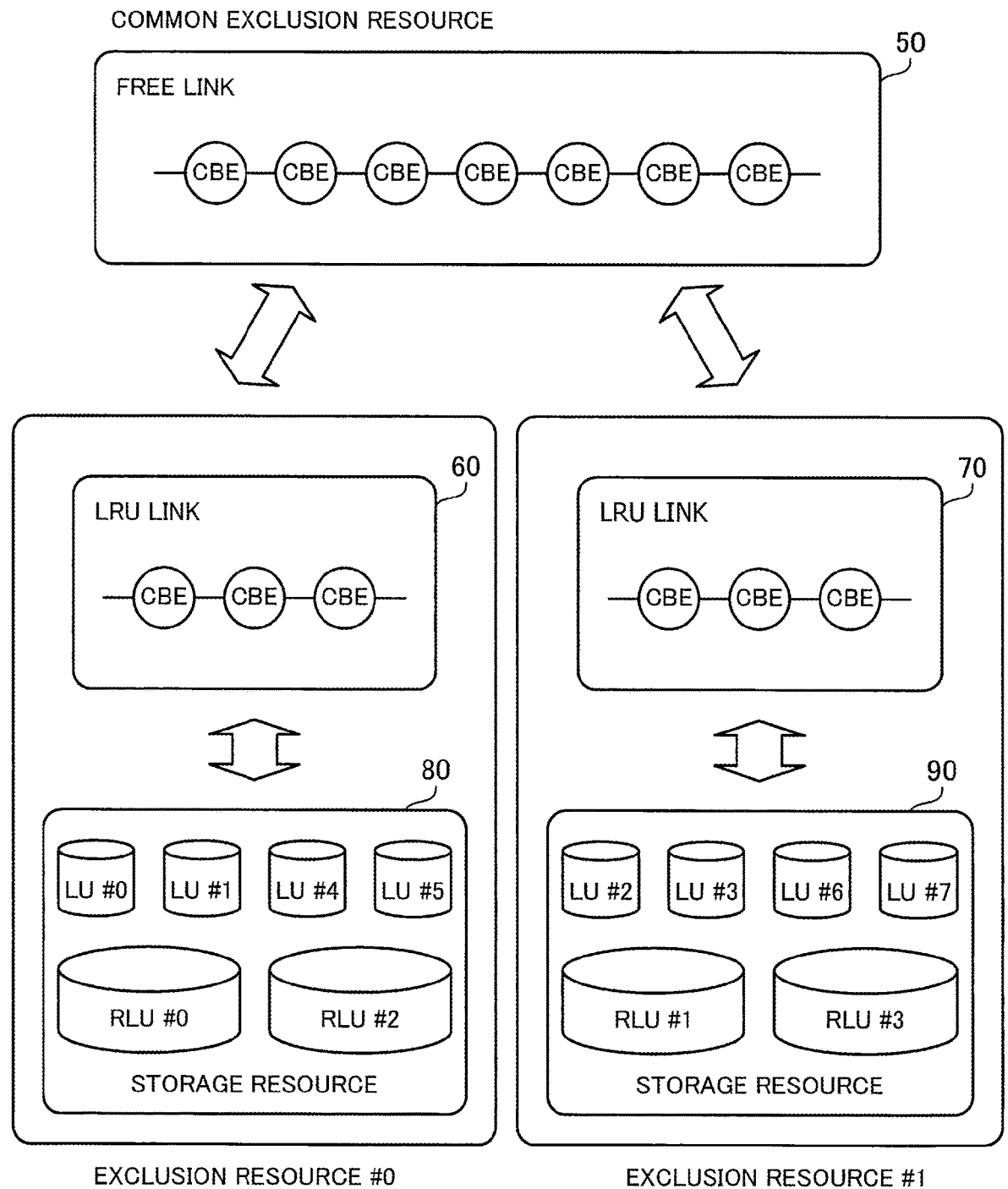
FIG. 4 illustrates an example of division of an exclusion resource.

FIG. 4 illustrates an example of division of an exclusion resource. A free link 50 is used to manage free pages. The free link 50 is associated with a common exclusion resource. The free link 50 is a single link which is provided for the whole pages of the cache. The common exclusion resource is a single exclusion resource which is provided for the free link 50. Thus, the operation to the free link 50 (for example, the acquisition of a CBE from the free link 50) is exclusively performed by one of the access-request processing units 150 and 160 which has acquired the common exclusion resource.

An LRU link 60 is allocated to a storage resource 80. The LRU link 60 is associated with an exclusion resource #0. An LRU link 70 is allocated to a storage resource 90. The LRU link 70 is associated with an exclusion resource #1. Thus, the LRU links 60 and 70 are provided with the different exclusion resources. As a result, the access-request processing units 150 and 160 operate the LRU links 60 and 70, in parallel.

For example, while the access-request processing unit 150 acquires the exclusion resource #0 and operates the LRU link 60, the access-request processing unit 160 acquires the exclusion resource #1 and operates the LRU link 70. In another case, while the access-request processing unit 160 acquires the exclusion resource #0 and operates the LRU link 60, the access-request processing unit 150 acquires the exclusion resource #1 and operates the LRU link 70.

The storage apparatus 100 includes an RLU #0, an RLU #1, an RLU #2, and an RLU #3, for example. The RLU #0 includes an LU #0 and an LU #1. The RLU #1 includes an LU #2 and an LU #3. The RLU #2 includes an LU #4 and an LU #5. The RLU #3 includes an LU #6 and an LU #7. The storage resource 80 includes the RLU #0 and the RLU #2. The storage resource 90 includes the RLU #1 and the RLU #3. That is, the number of RLUs of the storage resource 80 is two, and the number of LUs of the storage resource 80 is four. The number of RLUs of the storage resource 90 is two, and the number of LUs of the storage resource 90 is four. Thus, the RLUs or the LUs are evenly allocated to the LRU links 60 and 70.

Figure 5:
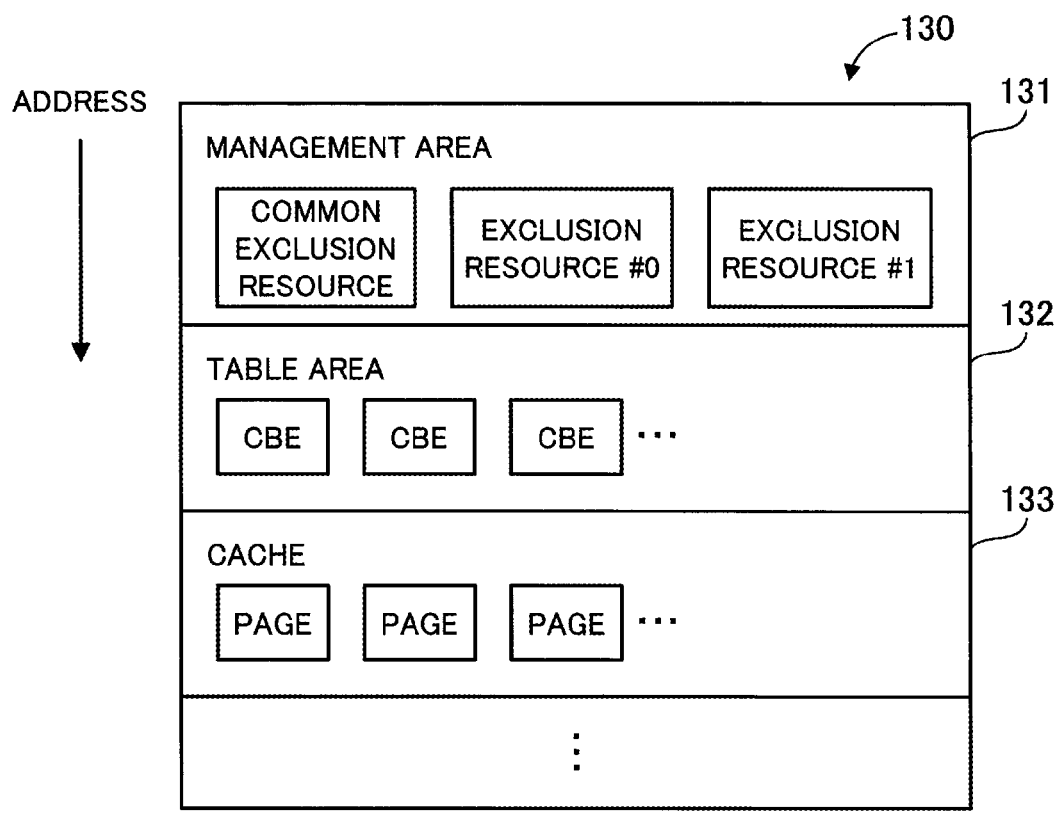
FIG. 5 illustrates an example of storage areas of a storage unit.

FIG. 5 illustrates an example of storage areas of the storage unit. The storage unit 130 includes a management area 131, a table area 132, and a cache 133. For example, the address indicating positions of the management area 131, the table area 132, and the cache 133 of the storage unit 130 increases in this order.

The management area 131 stores the common exclusion resource, and the exclusion resources #0 and #1. As previously described, the common exclusion resource is an exclusion resource (semaphore) corresponding to the free link 50. The exclusion resource #0 is an exclusion resource (semaphore) corresponding to the LRU link 60. The exclusion resource #1 is an exclusion resource (semaphore) corresponding to the LRU link 70. The common exclusion resource and the exclusion resources #0 and #1 are flags (called exclusion flags) used for exclusive control. Each of the flags indicates that a corresponding exclusion resource has been acquired by the access-request processing unit 150 or 160, or that the corresponding exclusion resource has not been acquired by the access-request processing units 150 and 160. For example, if one exclusion flag which is the common exclusion resource, or the exclusion resource #0 or #1 is "1", the corresponding exclusion resource has been acquired; if the one exclusion flag is "0", the corresponding exclusion resource has not been acquired.

The table area 132 stores a plurality of CBEs. A single CBE is associated with a single page of the cache 133.

The cache 133 is a storage area storing a plurality of pages. As previously described, the size of one page is 65 KB, for example.

Figure 6:
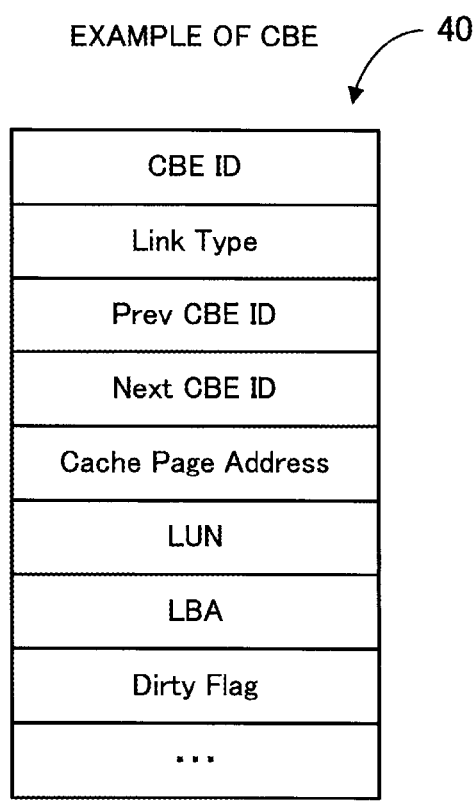
FIG. 6 illustrates an example of a cache bundle element (CBE)

FIG. 6 illustrates an example of the CBE. A CBE 40 may be a structure having a plurality of fields. The fields of the CBE 40 include CBE Identifier (ID), Link Type, Prev CBE ID, Next CBE ID, Cache Page Address, LUN, Logical Block Address (LBA), and Dirty Flag.

The CBE ID field has identification information on the CBE. The Link Type field has information on whether a link of the CBE is a free link or an LRU link. The Prev CBE ID field has a pointer indicating a previous CBE. The Next CBE ID field has a pointer indicating a next CBE. The Cache Page Address field has an address of a page of the cache 133 (that is, an address of a page corresponding to the CBE). The LUN field has a logical unit number of an LU in which the data stored in the page is stored. The LBA field has a logical block address of the LU, at which the data is stored. The Dirty Flag field has a dirty flag. For example, the Dirty Flag is "True" if the data of the page is yet to be written back, or is "False" if the data of the page has been written back or is not to be written back.

For example, when a CBE is associated with a free page, the Link Type of the CBE indicates a free link, the LUN and the LBA has no information, and the Dirty Flag is "False".

In addition, when a CBE is associated with a page which is being used, the Link Type of the CBE indicates an LRU link. The LUN and the LBA indicate a storage area in which the data of the page is stored (the storage area is an area which the data is to be written back to, or has been read from). The Dirty Flag has a value determined depending on whether the write back has been performed or not.

Figure 7:
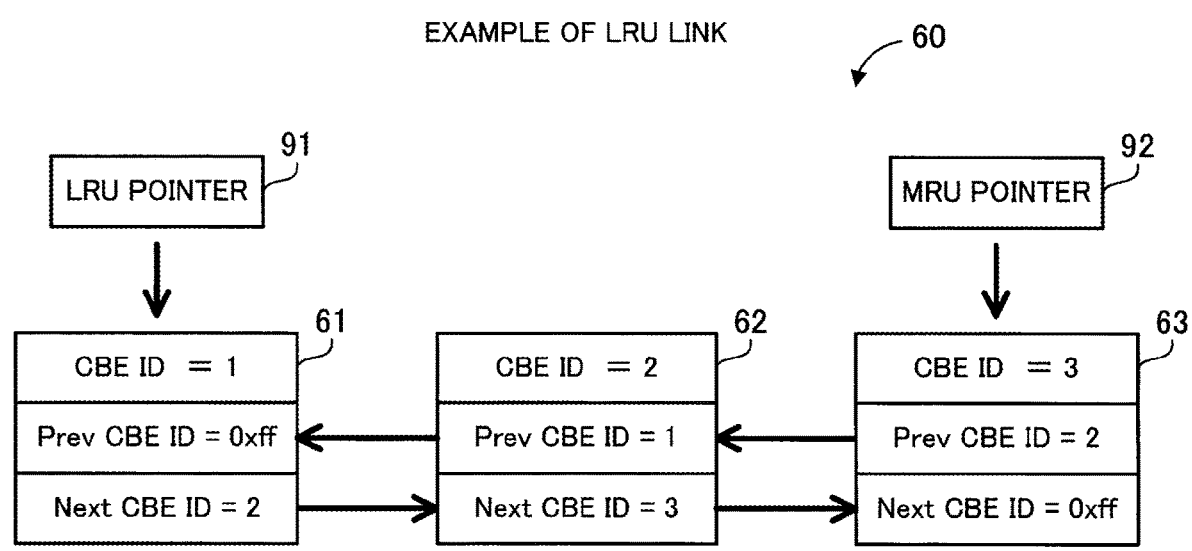
FIG. 7 illustrates an example of an LRU link.

FIG. 7 illustrates an example of an LRU link. For example, the LRU link 60 has a CBE 61, a CBE 62, and a CBE 63. In FIG. 7, some of the plurality of fields illustrated in FIG. 6 are omitted.

The CBE 61 is a most LRU-side link element of the LRU link 60. The CBE 61 is indicated by an LRU pointer 91. For example, the CBE ID of the CBE 61 is "1". The Prev CBE ID of the CBE 61 is "0xff". The value "0xff" of the Prev CBE ID indicates that there is no previous CBE. The Next CBE ID of the CBE 61 is "2".

The CBE 62 is a link element indicated by the Next CBE ID of the CBE 61. The CBE ID of the CBE 62 is "2". The Prev CBE ID of the CBE 62 is "1". The Next CBE ID of the CBE 62 is "3".

The CBE 63 is a link element indicated by the Next CBE ID of the CBE 62. The CBE 63 is a most MRU-side link element of the LRU link 60. The CBE 63 is indicated by an MRU pointer 92. For example, the CBE ID of the CBE 63 is "3". The Prev CBE ID of the CBE 63 is "2". The Next CBE ID of the CBE 63 is "0xff". The value "0xff" of the Next CBE ID indicates that there is no next CBE.

When a CBE is added to the LRU link 60, the CBE is added to an MRU-side link element.

Also in the LRU link 70, CBEs are linked with each other by pointers. An LRU pointer and an MRU pointer for the LRU link 70 are provided, separately from the LRU pointer 91 and the MRU pointer 92.

The LRU pointer 91 and the MRU pointer 92 may be stored in a predetermined storage area of the table area 132, and the predetermined storage area may correspond to the exclusion resource #0. Alternatively, the LRU pointer 91 and the MRU pointer 92 may be stored in the management area 131, together with the exclusion resource #0. In this case, the LRU pointer 91 and the MRU pointer 92 may be stored in a storage area which is continuous with the exclusion resource #0. The same holds true for the LRU pointer and the MRU pointer used for the LRU link 70.

Figure 8:
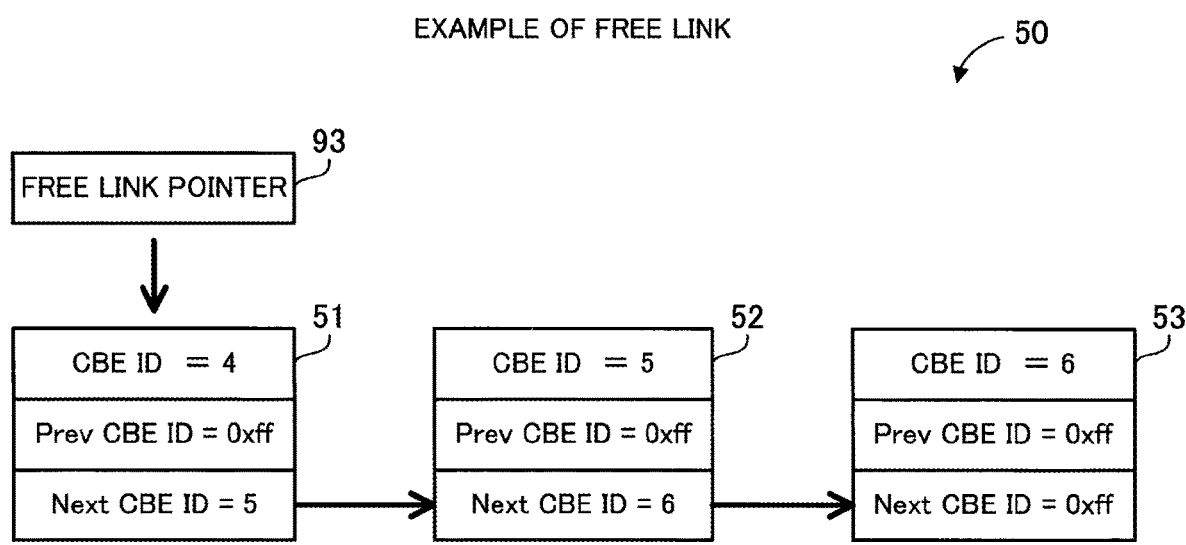
FIG. 8 illustrates an example of a free link.

FIG. 8 illustrates an example of a free link. For example, the free link 50 has a CBE 51, a CBE 52, and a CBE 53. In FIG. 8, some of the plurality of fields illustrated in FIG. 6 are omitted.

The CBE 51 is a top link element of the free link 50. The CBE 51 is indicated by a free link pointer 93. The free link pointer 93 indicates the top CBE of the free link 50. For example, the CBE ID of the CBE 51 is "4". The Prev CBE ID of the CBE 51 is "0xff". The Next CBE ID of the CBE 51 is "5".

The CBE 52 is a link element indicated by the Next CBE ID of the CBE 51. The CBE ID of the CBE 52 is "5". The Prev CBE ID of the CBE 52 is "0xff". The Next CBE ID of the CBE 52 is "6".

The CBE 53 is a link element indicated by the Next CBE ID of the CBE 52. The CBE ID of the CBE 53 is "6". The Prev CBE ID of the CBE 53 is "0xff". The Next CBE ID of the CBE 53 is "0xff".

Here, the Prev CBE ID of each CBE of the free link 50 may be "0xff", as described above. Alternatively, the Prev CBE ID of each CBE of the free link 50 may have a specific value (for example, the Prev CBE ID of the CBE 52 may be "4", and the Prev CBE ID of the CBE 53 may be "5").

The free link pointer 93 may be stored in a predetermined storage area of the table area 132, and the predetermined storage area may correspond to the common exclusion resource. Alternatively, the free link pointer 93 may be stored in the management area 131, together with the common exclusion resource. In this case, the free link pointer 93 may be stored in a storage area which is continuous with the common exclusion resource.

Next, the procedure of the processing by the CM 110 will be described. First, a process for allocating a newly created LU to the LRU link 60 or 70 will be described.

Figure 9:
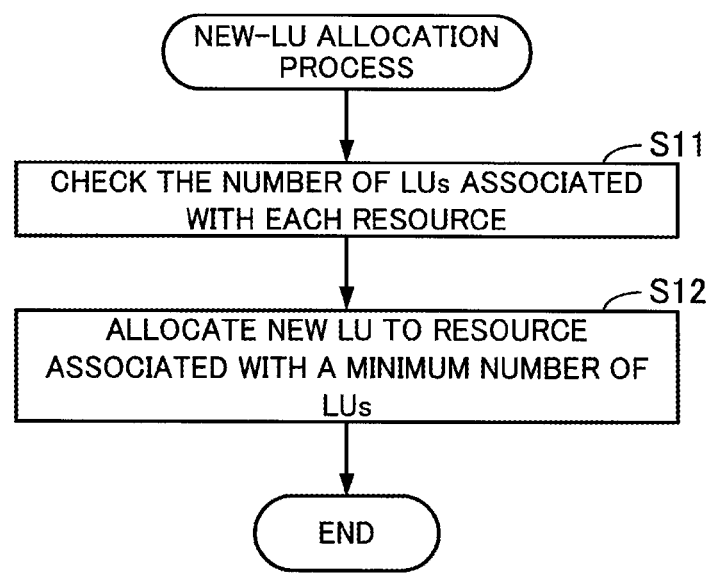
FIG. 9 is a flowchart illustrating an example of a new-LU allocation process.

FIG. 9 is a flowchart illustrating an example of a new-LU allocation process. Hereinafter, the process illustrated in FIG. 9 will be described in the order of step numbers.

In S11, the resource allocation unit 140 checks the number of LUs associated with each of resources. Here, the resources are the exclusion resources #0 and #1, or the LRU links 60 and 70 corresponding to the exclusion resources #0 and #1.

In S12, the resource allocation unit 140 allocates a new LU to a resource associated with a minimum number of LUs. For example, when the LRU link 60 is associated with the minimum number of LUs, the resource allocation unit 140 allocates the new LU to the LRU link 60. The resource allocation unit 140 stores information indicating the relationship between LUs and a corresponding exclusion resource, in the storage unit 130. With this operation, the access-request processing unit 150 or 160 checks the information on LUs contained in an access request, and the information stored in the storage unit 130; and identifies an exclusion resource to be acquired and an LRU link corresponding to the exclusion resource.

Next, the procedure performed by the access-request processing unit 150 will be described. Here, although the procedure by the access-request processing unit 150 will be mainly described as an example, the access-request processing unit 160 also performs the same procedure as that by the access-request processing unit 150.

Figure 10:
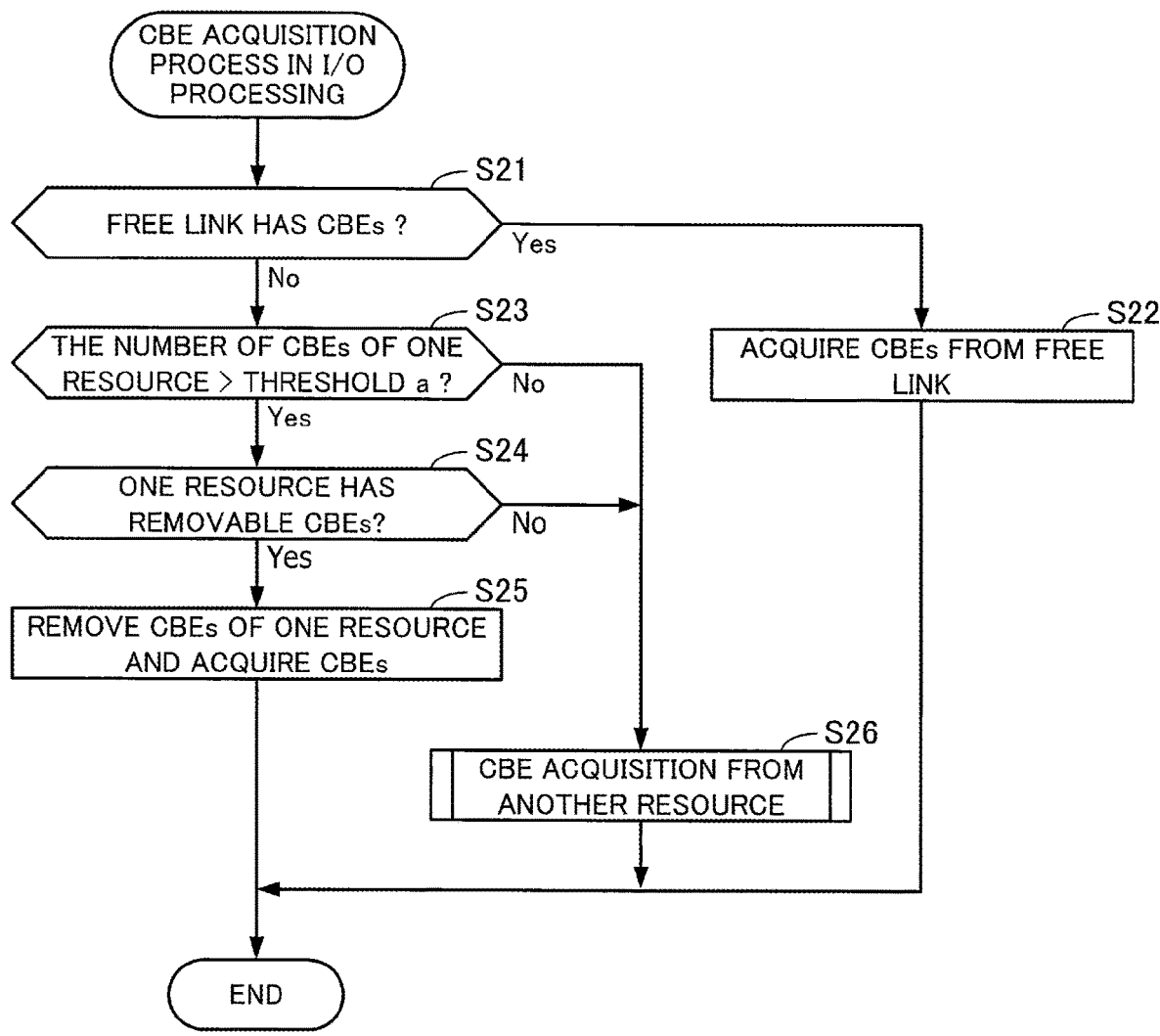
FIG. 10 is a flowchart illustrating an example of a CBE acquisition process performed in I/O processing.

FIG. 10 is a flowchart illustrating an example of a CBE acquisition process performed in I/O processing. Hereinafter, the process illustrated in FIG. 10 will be described in the order of step numbers. The access-request processing unit 150 performs the following procedure to acquire a new CBE in its new I/O processing. In the following description, the I/O processing is performed on the storage resource 80, for example. However, the same procedure will be performed when the I/O processing is performed on the storage resource 90.

In S21, the access-request processing unit 150 determines whether the free link 50 has CBEs. If the free link 50 has CBEs, the access-request processing unit 150 proceeds to Step S22. If the free link 50 has no CBEs, the access-request processing unit 150 proceeds to Step S23.

In S22, the access-request processing unit 150 acquires CBEs from the free link 50. Specifically, the access-request processing unit 150 sets the common exclusion resource as "acquired", acquires CBEs from the free link 50 (for example, from the top of the free link 50) (the CBEs are removed from the free link 50), and sets the common exclusion resource as "not acquired". Then the access-request processing unit 150 sets the exclusion resource #0 as "acquired", and links the acquired CBEs to an MRU-side link element of the LRU link 60. Then the access-request processing unit 150 sets the exclusion resource #0 as "not acquired". After that, the access-request processing unit 150 completes the CBE acquisition process performed in I/O processing.

In S23, the access-request processing unit 150 determines whether the number of CBEs of one resource is larger than a threshold "a" (the number of CBEs of one resource>threshold a). If the number of CBEs of the one resource is larger than the threshold "a", the access-request processing unit 150 proceeds to Step S24. If the number of CBEs of the one resource is equal to or smaller than the threshold "a", the access-request processing unit 150 proceeds to Step S26. Here, the one resource is the LRU link 60 which the access-request processing unit 150 currently refers to. Thus, the number of CBEs of the one resource is the number of CBEs of the LRU link 60 which the access-request processing unit 150 currently refers to.

The threshold "a" is a target value on the number of CBEs linked in an LRU link which is associated with a frequently-accessed storage resource. The threshold "a" is predetermined in accordance with the number of LRU links, and access condition to data. For example, when two LRU links are used, the threshold "a" may satisfy a≥P/2, where P is the number of all CBEs (that is, the number of all pages).

In S24, the access-request processing unit 150 determines whether the one resource has CBEs which may be removed. If the one resource has CBEs which may be removed, the access-request processing unit 150 proceeds to Step S25. If the one resource does not have CBEs which may be removed, the access-request processing unit 150 proceeds to Step S26. When the access-request processing unit 150 is able to acquire CBEs which amount to the data size currently needed from the LRU link 60 by selecting, preferentially from the LRU side, CBEs whose Dirty Flags are "False", it is determined that the one resource has CBEs which may be removed. When the access-request processing unit 150 is unable to acquire the CBEs which amount to the data size currently needed from the LRU link 60, it is determined that the one resource does not have CBEs which may be removed.

In S25, the access-request processing unit 150 removes CBEs of the one resource, and acquires CBEs. Specifically, the access-request processing unit 150 sets the exclusion resource #0 as "acquired"; removes CBEs, which may be removed, from the LRU link 60 (unallocates pages corresponding to the CBEs); and links the CBEs to an MRU-side link element of the LRU link 60. Then the access-request processing unit 150 sets the exclusion resource #0 as "not acquired". After that, the access-request processing unit 150 completes the CBE acquisition process performed in I/O processing.

In S26, the access-request processing unit 150 acquires CBEs from another resource. The detailed description of the process will be made later. The CBE acquisition from the other resource may be performed by moving CBEs from the other resource to the one resource. After that, the access-request processing unit 150 completes the CBE acquisition process performed in I/O processing.

When acquiring new pages for the storage resource 80 by performing the above-described procedure, the access-request processing unit 150 stores data involved in the I/O processing, in the new pages.

Figure 11:
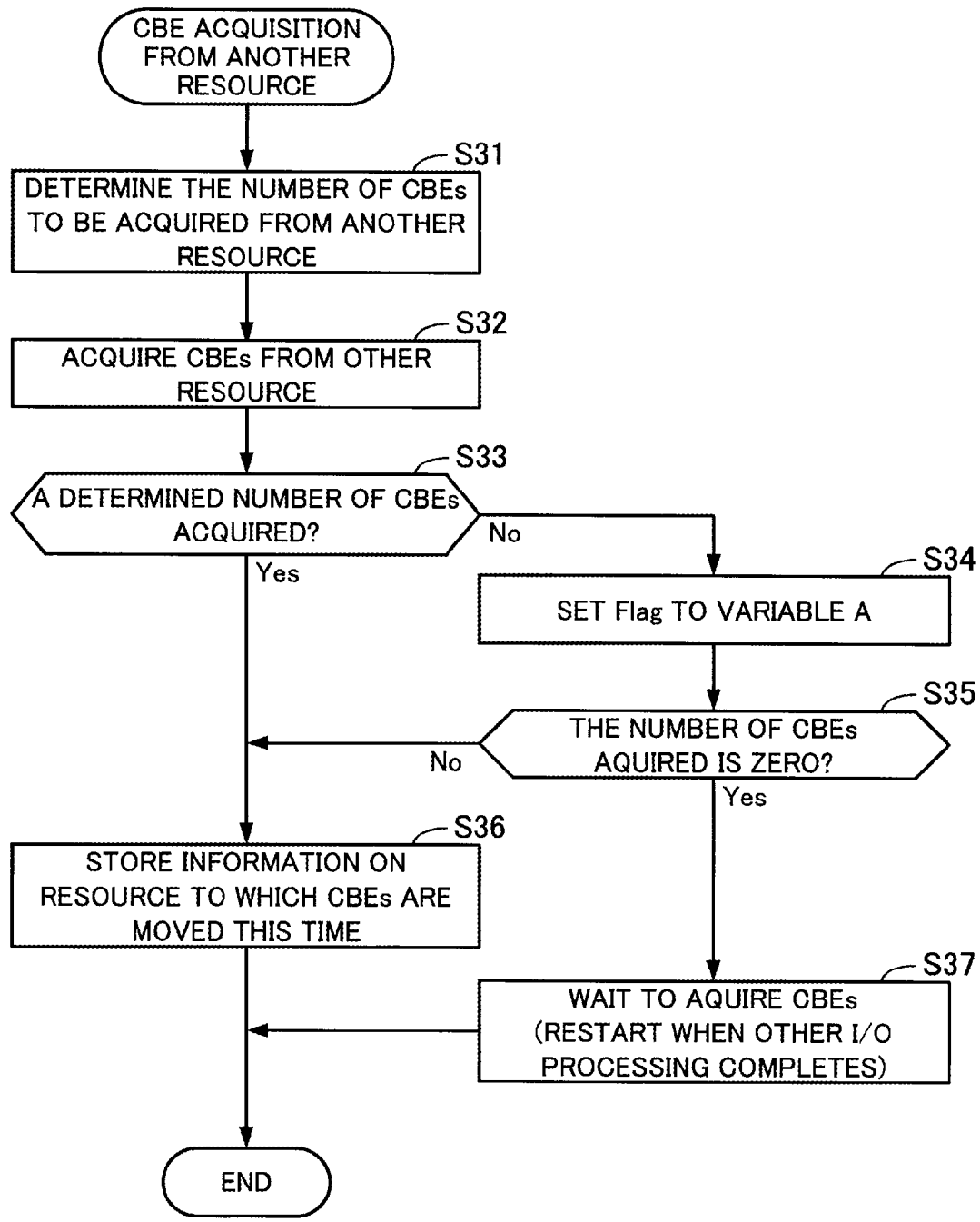
FIG. 11 is a flowchart illustrating an example of a process to acquire CBEs from another resource.

FIG. 11 is a flowchart illustrating an example of a process to acquire CBEs from another resource. Hereinafter, the process illustrated in FIG. 11 will be described in the order of step numbers.

In S31, the access-request processing unit 150 determines the number of CBEs to be acquired from the other resource. Here, the other resource is an LRU link corresponding to an exclusion resource other than that currently acquired by the access-request processing unit 150. For example, the access-request processing unit 150 may determine the number of CBEs to be acquired, in advance. Alternatively, the access-request processing unit 150 may determine the number by calculating the number of CBEs which makes up the shortage in Step S24, and acquire the calculated number of CBEs. Furthermore, the number may be proportional to the calculated number of CBEs.

As described later, the storage unit 130 stores information on an LRU link to which CBEs have previously been moved from another LRU link. When the access-request processing unit 150 determines based on the information that the access-request processing unit 150 will move CBEs successively to the LRU link to which the access-request processing unit 150 moved CBEs last time, the access-request processing unit 150 may increase the number of CBEs which the access-request processing unit 150 will acquire at a time from an LRU link from which CBEs are moved. Specifically, the access-request processing unit 150 may acquire five CBEs in the first movement, and acquire ten CBEs (twice the number of CBEs acquired in the first time) in the second movement if the CBEs are moved to an identical LRU link in the second time. Furthermore, the access-request processing unit 150 may increase the number of CBEs which the access-request processing unit 150 will acquire at a time, in accordance with the number of times in which CBEs have been successively moved to an identical LRU link (for example, in the previous example, if CBEs are moved to the identical LRU link in the third movement of CBEs, the access-request processing unit 150 may acquire twenty CBEs (four times the number of CBEs acquired in the first movement).

In S32, the access-request processing unit 150 acquires CBEs from the other resource. For example, when CBEs are moved from the LRU link 70 to the LRU link 60, the access-request processing unit 150 acquires the exclusion resource #1; and acquires LRU-side CBEs, prior to the others, by the number of CBEs determined in Step S31, from the LRU link 70. Then the access-request processing unit 150 sets the exclusion resource #1 as "not acquired". In this case, the access-request processing unit 150 does not acquire a CBE whose Dirty Flag is "True" (the write back is yet to be performed). Then the access-request processing unit 150 acquires the exclusion resource #0, and links the acquired CBEs to an MRU-side link element of the LRU link 60. Then the access-request processing unit 150 sets the exclusion resource #0 as "not acquired".

In S33, the access-request processing unit 150 determines whether the access-request processing unit 150 has acquired CBEs in Step S32 by the number of CBEs determined in Step S31. If the access-request processing unit 150 has acquired the CBEs, the access-request processing unit 150 proceeds to Step S36. If the access-request processing unit 150 has not acquired the CBEs, the access-request processing unit 150 proceeds to Step S34.

In S34, the access-request processing unit 150 sets a Flag to a variable "A" (which is a global variable). Here, the Flag which has been set to the variable "A" is referred to as a FlagA. When the Flag is set to the variable "A", the FlagA becomes "True". When the FlagA is "True", there is an LRU link waiting to acquire CBEs. When the FlagA is "False", there is no LRU link waiting to acquire CBEs.

In S35, the access-request processing unit 150 determines whether the number of CBEs acquired in Step S32 is zero. If the number of CBEs acquired is zero, the access-request processing unit 150 proceeds to Step S37. If the number of CBEs acquired is not zero, the access-request processing unit 150 proceeds to Step S36.

In S36, the access-request processing unit 150 stores information on a resource (LRU link) to which CBEs have been moved this time, in the storage unit 130. In this time, the access-request processing unit 150 may also store the number of times, in which CBEs have been successively moved to the resource, in the storage unit 130. The information stored in Step S36 will be used when the access-request processing unit 150 or 160 executes Step S31. Then the access-request processing unit 150 completes the process to acquire CBEs from the other resource.

In S37, the access-request processing unit 150 transitions to a CBE-waiting state. Specifically, when other I/O processing (such as the write back performed by the access-request processing unit 160) completes, the access-request processing unit 150 restarts the CBE acquisition process performed in I/O processing. Then the access-request processing unit 150 re-executes the CBE acquisition process, and completes the process to acquire CBEs from the other resource.

When acquiring new pages for the storage resource 80, the access-request processing unit 150 stores data involved in the I/O processing, in the new pages.

In this manner, when the CM 110 adds CBEs to the LRU link 60 in I/O processing, the CM 110 moves CBEs of the LRU link 70 to the LRU link 60 if the cache 133 has no free pages (movement of CBEs in prolonged I/O processing).

In particular, as described above, when CBEs are moved to an identical link to which CBEs have previously been moved, the access-request processing unit 150 increases the number of CBEs to be moved this time, from the number of CBEs moved last time. With this operation, more cache capacity is allocated in advance to a storage resource which is being frequently accessed. As a result, the frequency of movement of CBEs caused by the later access to the storage resource will be reduced, which reduces the overhead caused by the movement of CBEs. Therefore, the CM 110 increases the speed of data access.

In addition, the CM 110 moves CBEs asynchronously to I/O processing.

Figure 12:
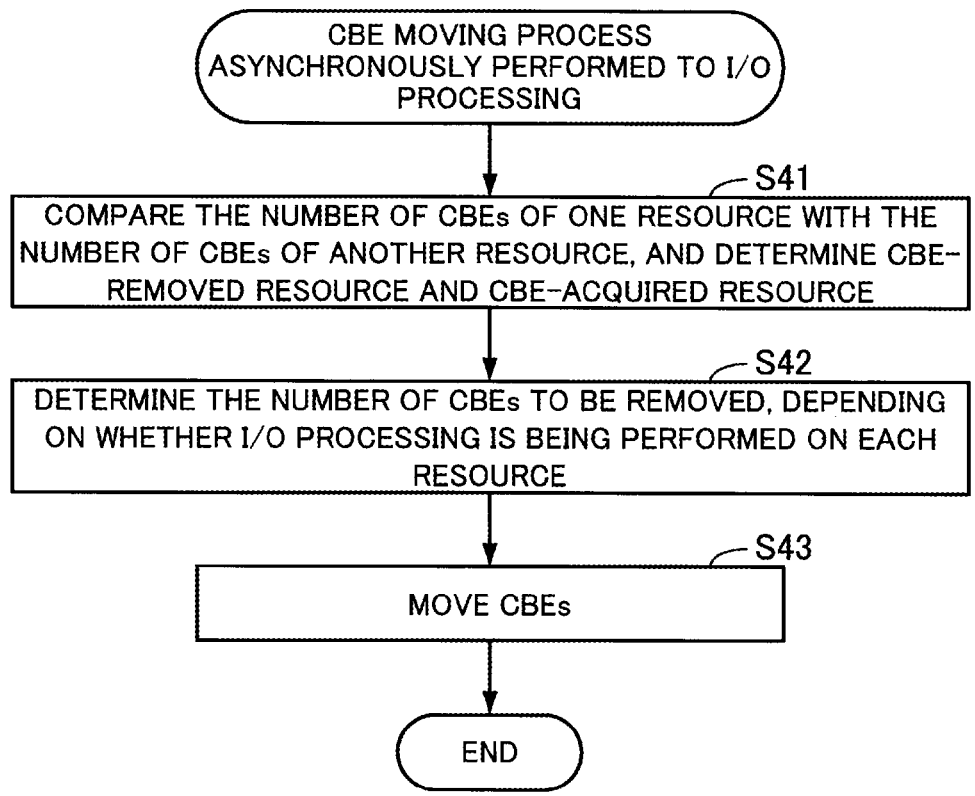
FIG. 12 is a flowchart illustrating an example of a CBE moving process performed asynchronously to I/O processing.

FIG. 12 is a flowchart illustrating an example of a CBE moving process performed asynchronously to I/O processing. Hereinafter, the process illustrated in FIG. 12 will be described in the order of step numbers.

In S41, the monitor unit 170 compares the number of CBEs of one resource with the number of CBEs of another resource, and determines a resource from which CBEs are moved and a resource to which CBEs are moved. Here, the number of CBEs of one resource is the number of CBEs of one link (for example, the LRU link 60), and the number of CBEs of another resource is the number of CBEs of another link (for example, the LRU link 70). For example, the monitor unit 170 determines an LRU link having a larger (or maximum) number of CBEs as a resource from which CBEs are moved, and an LRU link having a smaller (or minimum) number of CBEs as a resource to which CBEs are moved. Here, to execute Step S41, the monitor unit 170 has counted the number of times in which I/O processing has been performed for each exclusion resource (or for each storage resource) for a predetermined period of time; and has stored the number in the storage unit 130. Here, the time prior to the present time by the predetermined period of time may be a time when the CBE moving process, performed asynchronously to I/O processing, was performed last time.

In S42, the monitor unit 170 determines the number of CBEs to be moved, depending on whether I/O processing is being performed on each resource. Here, whether I/O processing is being performed on each resource means whether I/O processing is being performed on a storage resource corresponding to each LRU link (for example, whether I/O processing is being performed on the storage resource 80, and whether I/O processing is being performed on the storage resource 90). Here, a storage resource corresponding to an LRU link to which CBEs are moved is referred to as a CBE-acquired storage resource, and a storage resource corresponding to an LRU link from which CBEs are moved is referred to as a CBE-removed storage resource.

In Step S42, the number of CBEs may be determined by using any of various methods. For example, if I/O processing has been performed on the CBE-acquired storage resource for a predetermined time, and if no I/O processing has been performed on the CBE-removed storage resource for the predetermined time, the monitor unit 170 determines the number of CBEs to be moved, as a predetermined number x. In another case, if a first number p of times of I/O processing on the CBE-acquired storage resource performed for a predetermined time is larger than a second number q of times of I/O processing on the CBE-removed storage resource performed for the predetermined time, the monitor unit 170 determines the number of CBEs to be moved, as the predetermined number x. Here, the number of times of I/O processing may be called as the number of accesses. The number of times of I/O processing (the number of accesses) is an indicator that indicates a load of each storage resource.

For example, when the cache 133 has a size of 65 mega bytes (MB), and the number of the whole pages is 1000 (obtained by dividing 65 MB by 65 KB), the predetermined number x may be about 10. In another case, the monitor unit 170 may determines the number x, depending on a difference d between the first number p of times of I/O processing and the second number q of times of I/O processing. More specifically, the monitor unit 170 may increase the number x as the difference d increases (for example, $x=\alpha \times d$, where $\alpha$ is a proportionality constant).

In S43, the monitor unit 170 moves CBEs by the number of CBEs determined in Step S42. Specifically, the monitor unit 170 acquires a CBE-removed exclusion resource, releases LRU-side CBEs of an LRU link corresponding to the acquired exclusion resource (but does not release a CBE whose Dirty Flag is "True"), and resets the exclusion resource as "not acquired". Then the monitor unit 170 acquires a CBE-acquired exclusion resource, and links the CBEs to an LRU link corresponding to the acquired exclusion resource. Then the monitor unit 170 resets the CBE-acquired exclusion resource as "not acquired". In this time, if the monitor unit 170 links CBEs to an LRU-side link element of the CBE-acquired LRU link, the CBEs (or pages corresponding to the CBEs) will be released and reused more quickly.

In this manner, the monitor unit 170 compares a load of the storage resource 80 with a load of the storage resource 90, at predetermined timings (for example, periodically). The monitor unit 170 moves CBEs from an LRU link corresponding to a storage resource having a smaller load, to an LRU link corresponding to a storage resource having a larger load. In particular, the monitor unit 170 may determine the number of CBEs to be moved, depending on the difference between the loads. For example, when the number of accesses is used as the load, more cache capacity is secured for a storage resource which is being frequently accessed. With this operation, the cache capacity is dynamically allocated to each storage resource in accordance with access condition to the storage resources, and thus the CM 110 increases the speed of data access.

Figure 13:
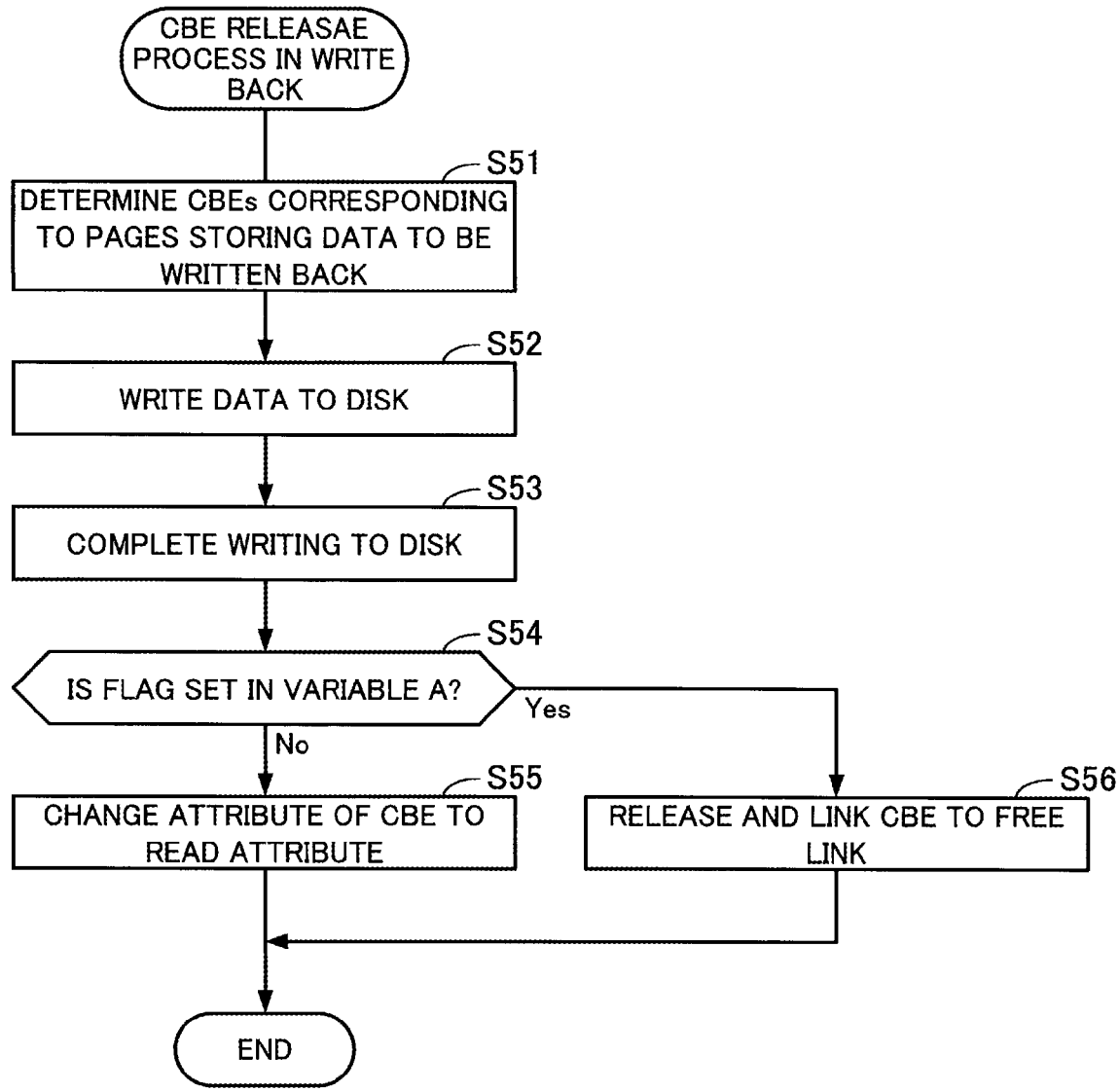
FIG. 13 is a flowchart illustrating an example of a CBE release process performed in write back.

FIG. 13 is a flowchart illustrating an example of a CBE release process performed in write back. Hereinafter, the process illustrated in FIG. 13 will be described in the order of step numbers. In the following description, although the write back will be performed from a page group managed by the LRU link 60 to the storage resource 80, the same holds true to the write back performed from a page group managed by the LRU link 70 to the storage resource 90. For example, the access-request processing unit 150 periodically executes the following procedure.

In S51, the access-request processing unit 150 acquires the exclusion resource #0; then refers to CBEs of the LRU link 60, sequentially from an LRU-side CBE to an MRU-side CBE; and determines CBEs whose Dirty Flags are "True", as CBEs corresponding to pages storing data to be written back. For example, the access-request processing unit 150 determines a predetermined number of CBEs in the order of the reference, as CBEs corresponding to pages storing data to be written back.

In S52, the access-request processing unit 150 reads data which is stored in the pages and will be written back, from the cache 133; and writes the data to the disks (the HDD 121, the HDD 122, the HDD 123, . . . ) (execution of write back). In this time, the access-request processing unit 150 obtains an LUN and an LBA of a storage resource to which the data is written, from an LUN field and an LBA field of a corresponding CBE.

In S53, the access-request processing unit 150 completes writing to the disks, performed by using the write back. Then the access-request processing unit 150 sets Dirty Flags of the CBEs, corresponding to the pages storing data having been written back, to "False".

In S54, the access-request processing unit 150 refers to the variable "A" stored in the storage unit 130, and determines whether the Flag is set in the variable "A". As described previously, when the Flag is set, the FlagA is "True". When the FlagA is "True", there is an LRU link waiting to acquire CBEs. When the Flag is set in the variable "A" (the FlagA is "True"), the access-request processing unit 150 proceeds to Step S56. When the Flag is not set in the variable "A" (the FlagA is "False"), the access-request processing unit 150 proceeds to Step S55.

In S55, the access-request processing unit 150 changes an attribute of the CBEs corresponding to the pages storing data having been written back, to a READ attribute. By changing the attribute to the READ attribute, the access-request processing unit 150 allows the pages corresponding to the CBEs to be used for an access request to read data. Then the access-request processing unit 150 sets the exclusion resource #0 as "not acquired". Then the access-request processing unit 150 completes the CBE release process performed in write back.

In S56, the access-request processing unit 150 acquires the common exclusion resource. Then the access-request processing unit 150 releases the CBEs of the LRU link 60 corresponding to the pages storing data having been written back, and links the CBEs to the free link 50. Then the access-request processing unit 150 sets the common exclusion resource and the exclusion resource #0 as "not acquired". In addition, the access-request processing unit 150 cancels the Flag of the variable "A" (sets the FlagA to "False"). Then the access-request processing unit 150 completes the CBE release process performed in write back.

In this manner, the access-request processing unit 150 writes data stored in pages of a page group indicated by an LRU link, to a storage resource; then determines whether another process is waiting to acquire pages associated with another LRU link. When the other process is waiting to acquire pages, the access-request processing unit 150 unallocates the pages storing data having been written back, and adds the CBEs corresponding to the unallocated pages, to the free link 50.

Thus, by adding the CBEs to the free link 50, the access-request processing unit 150 enables the other process waiting to acquire CBEs to acquire the CBEs from the free link 50. That is, when one page group indicated by one LRU link has an insufficient number of reusable pages, and when the one page group has an insufficient number of pages which may be moved to another page group indicated by another LRU link, the CM 110 moves CBEs of one of the LRU links to the free link 50. Then the CM 110 adds the CBEs which has been moved to the free link 50, to an LRU link waiting to acquire CBEs. Here, if another process is waiting to acquire CBEs (in Step S37 of FIG. 11), the access-request processing unit 150 may notify the other process that the I/O processing using the write back has completed.

By the way, the CM 110 could manage pages of the cache 133, which are being used, by using a single link and a single exclusion resource corresponding to the single link. However, in the case where the cache 133 is shared by the core 111a, the core 111b, . . . as in SMP, while one core acquires an exclusion resource and processes an access request, the other cores have to wait to acquire the exclusion resource. This lowers the degree of parallel processing to access the storage apparatus (I/O processing).

For this reason, the CM 110 divides a logical area provided by the HDD 121, the HDD 122, the HDD 123, . . . into a plurality of storage resources, and allows each storage resource to have a corresponding LRU link and exclusion resource. The number of the links (or storage resources) is two in the second embodiment, but may be determined depending on the number of cores. If the number of cores is M (M is an integer equal to or larger than 2), the number N of the LRU links satisfies 2≤N≤M (N is an integer equal to or larger than 2). Each core allocates a corresponding storage resource to one of N number of exclusion resources, acquires the allocated exclusion resource, and performs I/O processing on the corresponding storage resource.

Thus, the CM 110 reduces time for the cores to wait to acquire an exclusion resource. As a result, the degree of parallel processing to access the storage apparatus 100 is increased. When the CM 110 is disposed outside the storage apparatus 100, the degree of parallel processing to access the storage apparatus 100 is also increased. The degree of reduction of the time to wait to acquire an exclusion resource is high when the LUs are evenly allocated to the exclusion resources (the LRU links), and when the load of I/O processing is substantially the same for each LU.

In addition, the single free link 50 is provided for the cache 133. The CM 110 acquires CBEs from the single free link 50 to add them to the LRU link 60 or 70. If a plurality of free links are provided such that one free link is provided for the LRU link 60 and another free link is provided for the LRU link 70, a cache capacity available to access one storage resource is limited by the number of free links. For example, if N number of free links are provided, the upper limit of a cache capacity available to access one storage resource becomes 1/N of the whole capacity of the cache. For this reason, the single free link 50 is provided. With the single free link 50, the CM 110 secures cache capacities for the storage resources in accordance with access condition (for example, a larger cache capacity is secured for a more accessed storage resource, and a smaller cache capacity is secured for a less accessed storage resource). Securing a larger cache capacity for a more accessed storage resource improves data access performance of the storage apparatus 100.

Here, an initial access condition to each storage resource is not necessarily constant. For example, although the number of accesses to one storage resource is initially large, it may decrease with time. In contrast, although the number of accesses to another storage resource is initially small, it may increase with time. If a core which has accessed, prior to the others, the free link 50 acquires CBEs, a more cache capacity will be secured for a storage resource which is initially more frequently accessed. With only this method, however, the cache would not be reallocated in accordance with later access condition.

Thus, for example, when there is no free page, and when the cache capacity (the number of CBEs) for the storage resource 80 runs short and becomes equals to or lower than a threshold (or the number of the link elements of the LRU link 60 becomes equal to or lower than a threshold "a"), the CM 110 reallocates pages which are being used for the storage resource 90, to the storage resource 80.

That is, the CM 110 acquires CBEs (which are, for example, LRU-side CBEs, and correspond to pages storing data having been written back) from the LRU link 70, and adds the CBEs to the LRU link 60 (movement of CBEs). In contrast, when the cache capacity for the storage resource 80 is larger than a threshold (or the number of CBEs of the LRU link 60 is larger than the threshold "a"), the CM 110 identifies pages of the LRU link 60 to be unallocated, and reuses them. For example, the CM 110 determines whether to move CBEs, synchronously or asynchronously to I/O processing; and moves the CBEs depending on the determination.

In the movement of CBEs, the CM 110 performs the following procedure. That is, the CM 110 acquires an exclusion resource corresponding to an LRU link from which CBEs are moved; then unallocates pages, which are associated with the LRU link from which CBEs are moved; then releases the exclusion resource corresponding to the LRU link from which CBE are moved; then acquires an exclusion resource corresponding to an LRU link to which CBEs are moved; and then adds the CBEs corresponding to the pages to the LRU link to which CBEs are moved. Thus, in a case where CBEs are moved every time the cache capacity runs short, when a storage resource corresponding to an LRU link to which CBEs are moved is frequently accessed, the access to the storage resource may take time. For this reason, the CM 110 changes the number of link elements to be moved at a time, in accordance with the load of each storage resource.

For example, when a storage resource corresponding to an LRU link to which CBEs are moved is successively accessed, the CM 110 increases the number of link elements to be moved at a time, in accordance with the number of successive accesses. More specifically, when a storage resource corresponding to an LRU link to which CBEs were moved last time is also accessed this time, the CM 110 increases the number of link elements to be moved, at a time, to the LRU link.

Alternatively, the CM 110 increases the number of link elements to be moved at a time, in accordance with a comparison result between a first number of accesses and a second number of accesses. The first number of accesses is a number by which a storage resource corresponding to one link, from which CBEs are moved, has been accessed. The second number of accesses is a number by which a storage resource corresponding to another link, to which CBEs are moved, has been accessed. For example, when the second number of accesses is larger than the first number of accesses, the CM 110 increases the number of CBEs to be moved at a time, in accordance with a difference between the second number of accesses and the first number of accesses. More specifically, the CM 110 increases the number of link elements to be moved at a time, as the difference between the second number of accesses and the first number of accesses increases.

In this manner, the CM 110 increases the number of CBEs to be moved, at a time, to an LRU link corresponding to a storage resource having its increasing load. With this operation, the CM 110 reduces the number of occurrences of cache capacity shortage. As a result, the CM 110 reduces the number of movements of CBEs caused when pages are reallocated, and increases the speed of data access.

The information processing in the first embodiment is achieved by causing the processing unit 1b to perform a program. The information processing in the second embodiment is achieved by causing the processor 111 to perform a program. The program is stored in the computer-readable storage medium 30.

The program is distributed by distributing the storage medium 30 which stores the program. Examples of the storage medium 30 include a flexible disk (FD), optical discs such as a compact disc (CD), a digital versatile disc (DVD), and a Blu-ray (registered trademark), and a magneto-optical disk (MO). In addition, the program may be stored in another computer, and distributed via a network. Computers may receive a program, which may be stored in the storage medium 30 or received from another computer; store (installs) the program in a storage device such as the RAM 112 or the flash memory 113; and read the program from the storage device to execute the program.

In one aspect, the degree of parallel processing to access a storage apparatus is increased.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
   a memory including a plurality of pages used as a cache area; and
   a processor configured to execute a process including:
   allocating a first storage resource to a first link and a second storage resource to a second link, the first link indicating a first page group of the plurality of pages, the second link indicating a second page group of the plurality of pages;
   processing, in parallel, access requests for accessing to the first storage resource and the second storage resource by using the first link and the second link,
   writing back data stored in a page of the second page group corresponding to a link element, to the second storage resource;
   determining whether another process is waiting to acquire a page associated with the first link; and
   when the another process is waiting to acquire the page, unallocating the page storing the data that has been written back and adding a link element corresponding to the unallocated page, to a free link including link elements indicating free pages.

2. The storage control apparatus according to claim 1, wherein the process further includes:

moving a link element of the second link to the first link in order that a link element corresponding to a page is added to the first link, when the cache area does not have free pages.

3. The storage control apparatus according to claim 2, wherein the process further includes:
moving the link element of the second link to the first link, when a number of link elements of the first link is equal to or smaller than a threshold; and
reusing a page corresponding to a link element of the first link, when the number of link elements of the first link is larger than the threshold.

4. The storage control apparatus according to claim 3, wherein the reusing includes moving the link element of the second link to the first link, when reusable pages of the first page group are insufficient.

5. The storage control apparatus according to claim 2, wherein the moving includes increasing a number of link elements to be moved, from a number of previously moved link elements, when moving the link elements to a link to which the previously moved link elements are moved.

6. The storage control apparatus according to claim 2, wherein the process further includes:
referring to the free link including a plurality of link elements corresponding to the free pages, and
adding a link element of the free link to the first link and another link element of the free link to the second link.

7. The storage control apparatus according to claim 2, wherein the process further includes:
adding the link element to the first link when storing, in the cache area, data to be written to the first storage resource or read from the first storage resource.

8. The storage control apparatus according to claim 4, wherein when reusable pages of the first page group are insufficient and movable pages of the second page group are insufficient, the moving includes moving a link element of the first link or the second link to the free link including link elements indicating the free pages and adding the link element of the free link to the first link.

9. The storage control apparatus according to claim 1, wherein the process further includes:
comparing a first load of the first storage resource with a second load of the second storage resource; and
moving a link element corresponding to a page, from a link corresponding to a storage resource having a smaller load to a link corresponding to a storage resource having a larger load.

10. The storage control apparatus according to claim 9, wherein the moving includes determining a number of link elements to be moved, in accordance with a difference between the first load and the second load.

11. The storage control apparatus according to claim 10, wherein the first load is a number of accesses to the first storage resource, and the second load is a number of accesses to the second storage resource.

12. The storage control apparatus according to claim 9, wherein the moving includes comparing the first load with the second load and moving the link element in accordance with a comparison result, at predetermined periods of time.

13. The storage control apparatus according to claim 1, wherein the process further includes:
equalizing a number of logical units of the first storage resource and a number of logical units of the second storage resource.

14. The storage control apparatus according to claim 1, wherein the processor includes a plurality of sub-processors configured to share the cache area and perform exclusive processing on the first link and exclusive processing on the second link, in parallel.

15. The storage control apparatus according to claim 1, wherein the first link and the second link are each data in which link elements corresponding to pages are linked by pointers.

16. The storage control apparatus according to claim 2, wherein the moving includes determining the link element to be moved, by using an LRU algorithm.

17. A non-transitory computer-readable storage medium storing a computer program that causes a computer to execute a process comprising:
allocating a first storage resource to a first link indicating a first page group of a plurality of pages used as a cache area;
allocating a second storage resource to a second link indicating a second page group of the plurality of pages;
processing, in parallel, access requests for accessing to the first storage resource and the second storage resource by using the first link and the second link,
writing back data stored in a page of the second page group corresponding to a link element, to the second storage resource;
determining whether another process is waiting to acquire a page associated with the first link; and
when the another process is waiting to acquire the page, unallocating the page storing the data that has been written back and adding a link element corresponding to the unallocated page, to a free link including link elements indicating free pages.

18. A storage control apparatus comprising:
a memory including a plurality of pages used as a cache area; and
a processor configured to execute a process including:
allocating a first storage resource to a first link and a second storage resource to a second link, the first link indicating a first page group of the plurality of pages, the second link indicating a second page group of the plurality of pages;
processing, in parallel, access requests for accessing to the first storage resource and the second storage resource by using the first link and the second link,
moving a link element of the second link to the first link in order that a link element corresponding to a page is added to the first link, when the cache area does not have free pages;
moving the link element of the second link to the first link, when a number of link elements of the first link is equal to or smaller than a threshold, and reusing a page corresponding to a link element of the first link, when the number of link elements of the first link is larger than the threshold;
the reusing includes moving the link element of the second link to the first link, when reusable pages of the first page group are insufficient; and
when the reusable pages of the first page group are insufficient and movable pages of the second page group are insufficient, the moving includes moving a link element of the first link or the second link to a free link including link elements indicating free pages and adding the link element of the free link to the first link.

19. A non-transitory computer-readable storage medium storing a computer program that causes a computer to execute a process comprising:

allocating a first storage resource to a first link indicating a first page group of a plurality of pages used as a cache area;

allocating a second storage resource to a second link indicating a second page group of the plurality of pages;

processing, in parallel, access requests for accessing to the first storage resource and the second storage resource by using the first link and the second link, moving a link element of the second link to the first link in order that a link element corresponding to a page is added to the first link, when the cache area does not have free pages;

moving the link element of the second link to the first link, when a number of link elements of the first link is equal to or smaller than a threshold, and reusing a page corresponding to a link element of the first link, when the number of link elements of the first link is larger than the threshold;

the reusing includes moving the link element of the second link to the first link, when reusable pages of the first page group are insufficient; and when the reusable pages of the first page group are insufficient and movable pages of the second page group are insufficient, the moving includes moving a link element of the first link or the second link to a free link including link elements indicating free pages and adding the link element of the free link to the first link.

* * * * *